US012608360B2

(12) United States Patent
Zeltwanger et al.

(10) Patent No.: US 12,608,360 B2
(45) Date of Patent: Apr. 21, 2026

(54) STORAGE OF SMALL TABLES AS PSEUDO TABLES

(71) Applicant: International Business Machines Corporation, Armonk, NY (US)

(72) Inventors: Hans-Jürgen Zeltwanger, Weinsberg (DE); Dirk Nakott, Stuttgart (DE); Jens Peter Seifert, Gaertringen (DE); Holger Hellmuth, Bensheim (DE); Jörn Klauke, Petersberg (DE); Martin Jungfer, Ostelsheim (DE); Thomas Rech, Rittersheim (DE); Alexander Zietlow, Sandhausen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/302,022

(22) Filed: Apr. 18, 2023

(65) Prior Publication Data

US 2024/0311358 A1     Sep. 19, 2024

(51) Int. Cl.
G06F 16/22     (2019.01)

(52) U.S. Cl.
CPC ................................. G06F 16/2282 (2019.01)

(58) Field of Classification Search
CPC .................................................. G06F 16/2282
See application file for complete search history.

(56) References Cited

U.S. PATENT DOCUMENTS 6,775,676 B1     8/2004  Briam
6,957,225 B1 *  10/2005  Zait ..................... G06F 16/2255
707/999.102

7,702,696 B2     4/2010  Ziegler
9,390,111 B2 *   7/2016  Kozin .................... G06F 16/211
10,664,477 B2    5/2020  Chiang
10,877,669 B1 * 12/2020  Sivasubramanian ........................
G06F 16/2282
10,977,224 B2    4/2021  Greenwood
11,550,787 B1 *  1/2023  Hernich ............ G06F 16/24539
11,593,306 B1 *  2/2023  Liu ....................... G06F 16/125
(Continued)

FOREIGN PATENT DOCUMENTS

CN          110352415 A  * 10/2019  ......... G06F 16/2282
WO     WO-2015011797 A1 *  1/2015  ....... G06F 17/30424

OTHER PUBLICATIONS

"A method to avoid sparsely filled tables in databases to save space supporting multi-tenant cloud computing environments", An IP.com Prior Art Database Technical Disclosure, IP.com No. IPCOM000201997D, IP.com Electronic Publication Date: Nov. 30, 2010, 5 pages, <https://priorart.ip.com/IPCOM/000201997>.

*Primary Examiner* — Neveen Abel Jalil
*Assistant Examiner* — Hubert Cheung
(74) *Attorney, Agent, or Firm* — Edward J. Wixted, III

(57)     ABSTRACT

In several aspects for storing a table, in which the table is configured for comprising records having values of one or more attributes, a processor creates a pseudo table representing the table, the creating comprising defining an empty version of the table in a program. One or more records may be inserted in the pseudo table by encoding attribute values of the one or more records as inline data in the program. In response to determining that the pseudo table satisfies a materialization criterion, the pseudo table may be materialized by creating the table with the records encoded in the program and removing the program.

17 Claims, 9 Drawing Sheets

(56)                    References Cited

U.S. PATENT DOCUMENTS

| | | | |
|---|---|---|---|
| 11,995,104 B2 * | 5/2024 | Hao | G06F 16/278 |
| 2003/0078917 A1 * | 4/2003 | Goralwalla | G06F 16/2438 |
| 2003/0088541 A1 * | 5/2003 | Zilio | G06F 16/22 |
| 2003/0220938 A1 * | 11/2003 | Norcott | G06F 16/217 |
| 2004/0002985 A1 * | 1/2004 | Pratley | G06F 40/183 |
| 2005/0216520 A1 * | 9/2005 | He | G06F 16/219 |
| 2006/0047696 A1 * | 3/2006 | Larson | G06F 16/24539 |
| 2006/0064428 A1 * | 3/2006 | Colaco | G06F 16/86 |
| 2007/0073759 A1 * | 3/2007 | El-Sabbagh | G06F 16/24544 |
| | | | 707/999.102 |
| 2007/0208696 A1 * | 9/2007 | Burger | G06F 16/2393 |
| 2008/0162512 A1 * | 7/2008 | Mall | G06F 16/284 |
| 2008/0256118 A1 * | 10/2008 | Ziegler | G06F 16/284 |
| | | | 707/999.102 |
| 2009/0198715 A1 * | 8/2009 | Barbarek | G06F 40/151 |
| 2012/0330954 A1 * | 12/2012 | Sivasubramanian | |
| | | | G06F 16/217 |
| | | | 707/E17.089 |
| 2013/0124241 A1 * | 5/2013 | Yeung | G06F 16/285 |
| | | | 705/7.11 |
| 2014/0280029 A1 * | 9/2014 | Ding | G06F 16/24539 |
| | | | 707/717 |
| 2015/0081745 A1 * | 3/2015 | Kozin | G06F 16/2393 |
| | | | 707/803 |
| 2016/0092545 A1 * | 3/2016 | Shivarudraiah | G06F 16/278 |
| | | | 707/600 |
| 2016/0259838 A1 * | 9/2016 | Banerjee | G06F 16/25 |
| 2018/0081561 A1 * | 3/2018 | Todd | G06F 11/1453 |
| 2019/0325047 A1 * | 10/2019 | Gao | G06F 16/2379 |
| 2020/0334232 A1 * | 10/2020 | Arye | G06F 16/215 |
| 2020/0364222 A1 * | 11/2020 | Sarapuk | G06F 16/24539 |
| 2021/0200446 A1 * | 7/2021 | Sivasubramanian | H04L 67/02 |
| 2021/0200728 A1 * | 7/2021 | Horesh | G06F 16/9024 |
| 2021/0334206 A1 | 10/2021 | Colgrove | |
| 2022/0019696 A1 * | 1/2022 | Ishikura | G06F 21/6254 |
| 2022/0171785 A1 * | 6/2022 | Shivarathri | G06F 16/254 |
| 2022/0197922 A1 * | 6/2022 | Karl | G06F 16/2282 |
| 2022/0300492 A1 * | 9/2022 | Papakonstantinou | |
| | | | G06F 16/2445 |
| 2023/0035166 A1 * | 2/2023 | Gottimukkala | G06F 16/2358 |
| 2023/0087066 A1 * | 3/2023 | Lueders | G06F 16/2365 |
| | | | 707/690 |

* cited by examiner

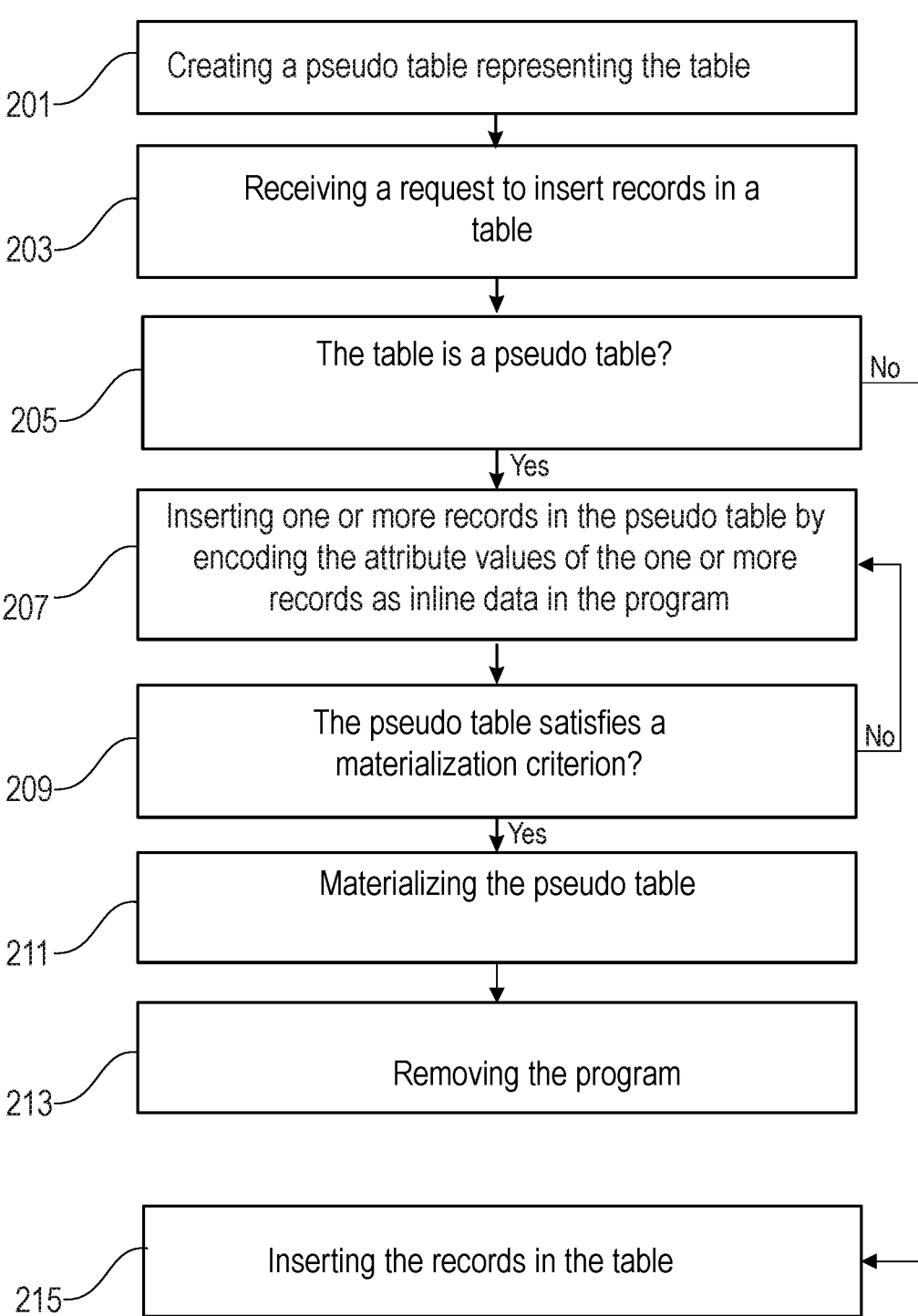

201 — Creating a pseudo table representing the table

203 — Receiving a request to insert records in a table

205 — The table is a pseudo table? — No

Yes

207 — Inserting one or more records in the pseudo table by encoding the attribute values of the one or more records as inline data in the program 209 — The pseudo table satisfies a materialization criterion? — No Yes 211 — Materializing the pseudo table 213 — Removing the program 215 — Inserting the records in the table

Fig. 2

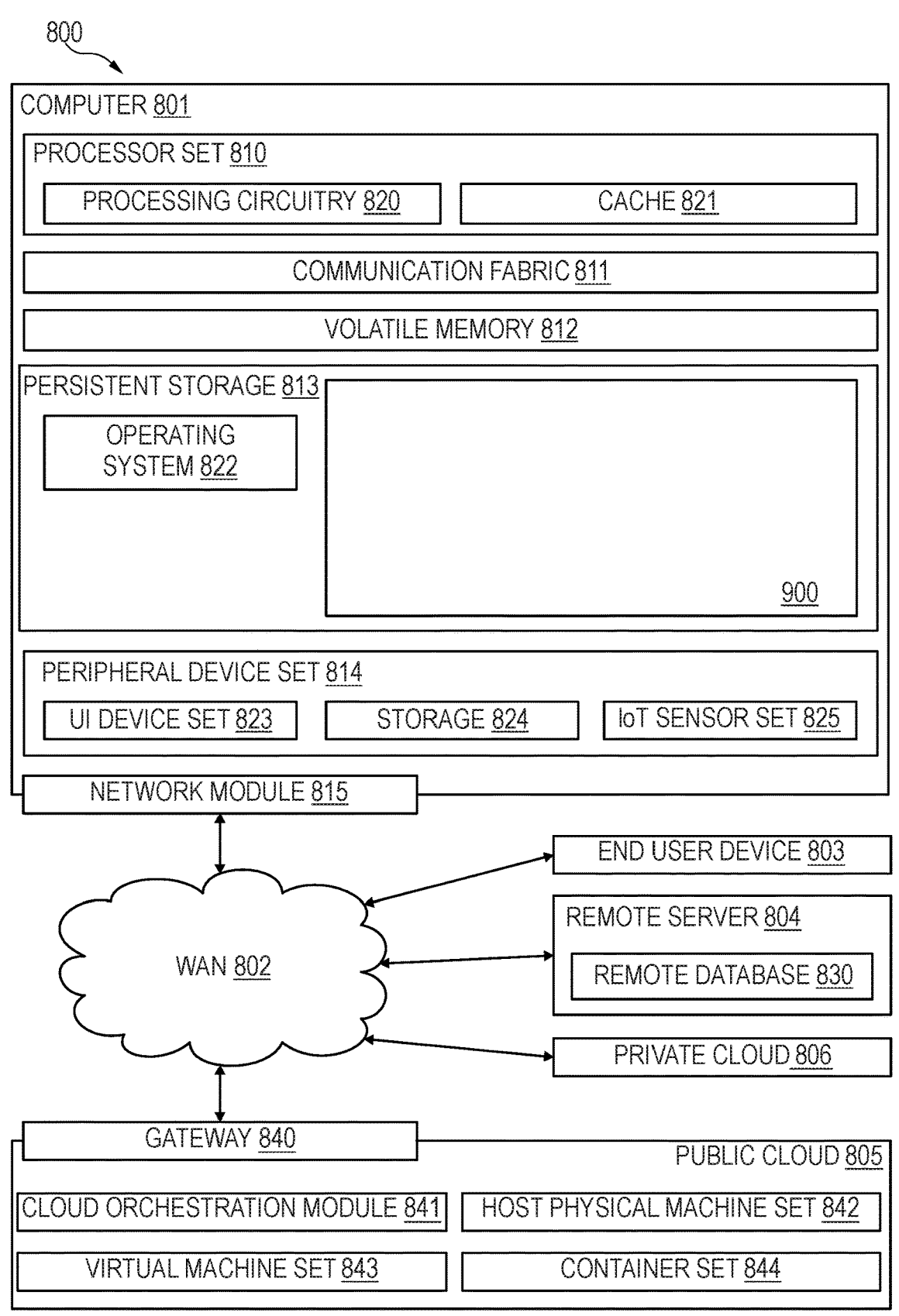

800

COMPUTER 801

PROCESSOR SET 810

PROCESSING CIRCUITRY 820   CACHE 821

COMMUNICATION FABRIC 811

VOLATILE MEMORY 812

PERSISTENT STORAGE 813

OPERATING SYSTEM 822

900

PERIPHERAL DEVICE SET 814

UI DEVICE SET 823   STORAGE 824   IoT SENSOR SET 825

NETWORK MODULE 815

WAN 802

END USER DEVICE 803

REMOTE SERVER 804

REMOTE DATABASE 830

PRIVATE CLOUD 806

GATEWAY 840

PUBLIC CLOUD 805

CLOUD ORCHESTRATION MODULE 841   HOST PHYSICAL MACHINE SET 842

VIRTUAL MACHINE SET 843   CONTAINER SET 844

Fig. 9

STORAGE OF SMALL TABLES AS PSEUDO TABLES

BACKGROUND

The present invention relates generally to the field of digital computer systems and more specifically to storage of small tables.

A database may comprise a variety of tables. The table may be a set of data elements using a model of vertical columns and horizontal rows, where the cell is the unit where a row and column intersect. A table has a specified number of columns. However, the table can have any number of rows, rendering their management a challenging task.

SUMMARY

Various embodiments provide a method, computer program product, and computer system for storing tables as described by the subject matter of the independent claims. Advantageous embodiments are described in the dependent claims. Embodiments of the present invention can be freely combined with each other if they are not mutually exclusive.

In one aspect, the invention relates to a method for storing a table, the table being configured for comprising records having values of one or more attributes. The method comprises: creating a pseudo table representing the table, the creating comprising defining an empty version of the table in a program; inserting one or more records in the pseudo table by encoding the attribute values of the one or more records as inline data in the program, wherein execution of the program enables access to the records; determining whether the pseudo table satisfies a materialization criterion; in response to determining that the pseudo table satisfies the materialization criterion, materializing the pseudo table by creating the table with the records encoded in the program and removing the program.

In one aspect the invention relates to a computer program product comprising a computer-readable storage medium having computer-readable program code embodied therewith, the computer-readable program code configured to implement the method of the above embodiment.

In one aspect the invention relates to a computer system for storing a table, the table being configured for comprising records having values of one or more attributes. The computer system is configured for: creating a pseudo table representing the table, the creating comprising defining an empty version of the table in a program; inserting one or more records in the pseudo table by encoding the attribute values of the one or more records as inline data in the program; determining whether the pseudo table satisfies a materialization criterion; in response to determining that the pseudo table satisfies the materialization criterion, materializing the pseudo table by creating the table with the records encoded in the program and removing the program.

BRIEF DESCRIPTION OF THE DRAWINGS

In the following embodiments of the invention are explained in greater detail, by way of example only, making reference to the drawings in which:

FIG. 2 is a flowchart of a method for storing a table in accordance with an embodiment of the present invention.

FIG. 9 is a computing environment in accordance with an embodiment of the present invention.

DETAILED DESCRIPTION

Figure 1:
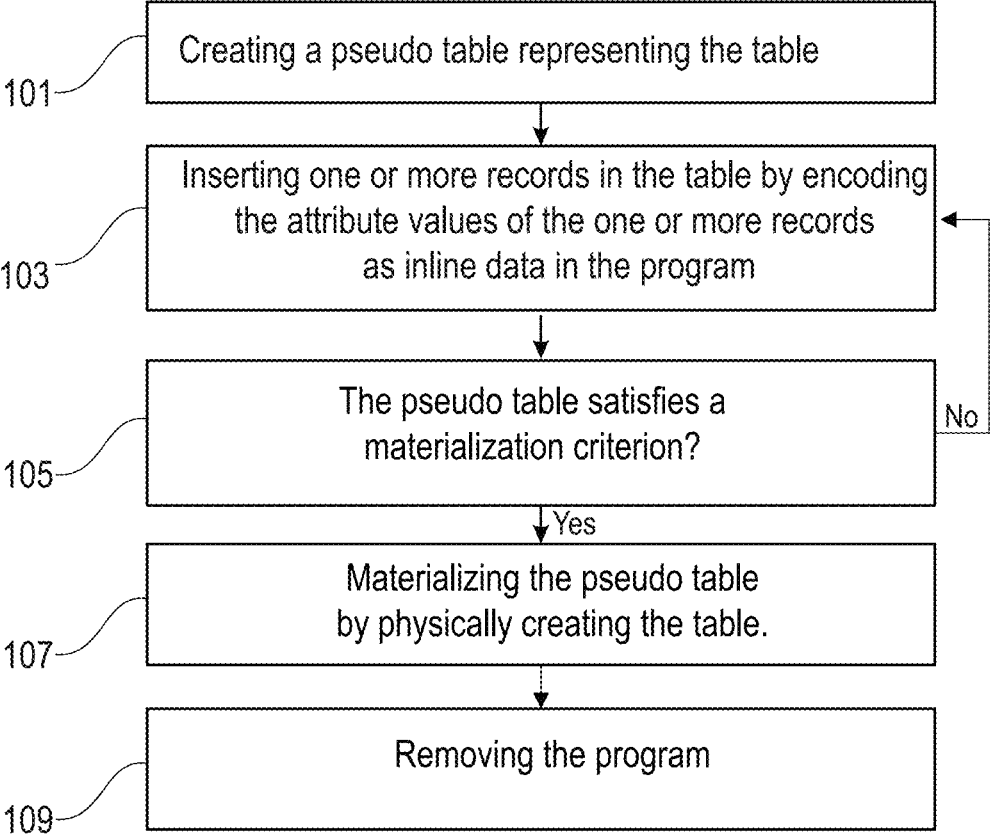
FIG. 1 is a flowchart of a method for storing a table in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "table" refers to a collection of related data held in a structured format. The table consists of attributes (also referred to as columns or fields), and records (or rows). Each record of the table may comprise values of the attributes and may represent a respective entity. For example, a student table may comprise attributes such as student ID, student age etc, wherein each record of the table represents an entity being a specific student.

The inline data may be attribute values that are included between instructions of a program. For example, the inline data may be data included between a beginning statement and ending statement of a program. Thus, encoding attribute values in the program may be referred to as inlining. The inline data may be included in the program according to a fixed format, e.g., attribute values that are float values may be included as small float format, e.g., up to two decimal places, etc. This may be advantageous as it may enable controlling the size of the program. For example, the size of the table may be reduced according to the present subject matter by choosing the format at which the attribute values may be included in the program.

The present subject matter may create an empty table as a pseudo table, e.g., without materializing it. Furthermore, data can be inlined into this pseudo table to avoid immediate materialization when inserting data into the table. The pseudo table may also be referred to as a virtual table. The pseudo table may be the created program. The ability to inline data into the pseudo table may be advantageous for the following reason. Table management systems such as the operating systems or relational database management systems may use tables to store data. Depending on the application or use case, many of these tables may be very small, e.g., only containing one single record or only a handful of records, or they may be even empty. However, small or empty tables may put some disproportional management overhead, e.g., on the database management system, such as initial space allocation costs or computing overhead like statistics collection or reorganization evaluation for mentioned tables or maintaining table control information in main memory. Furthermore, some database management systems may have implemented a limit on the maximum number of physical table objects it can handle, and unused small tables would unnecessarily count to this limit. The present subject matter may solve this issue by reducing the overhead and thus resource consumption because the number of small or empty tables may be reduced. This may especially be beneficial on cloud-based environments when considering pay-as-you-use models. In addition, some of the storage required by a physical table may be saved as the created program for that physical table may use less storage space.

According to one example, the method further comprises: providing a database management system (DBMS) wherein the program is a database view, wherein execution of the program is performed by the DBMS for enabling access to the records. The DBMS may be associated with a database. The DBMS may provide an application programming interface (API) and a processor for database languages such as Structured Query Language (SQL) to allow applications to interact with and manipulate the database.

This example may enable implementing the pseudo table as a view that addresses the already mentioned issues of wasted space, administrative and resource consumption overhead, as well as a maximum number of allowed physical objects, while, on the other hand, re-using the already existing concept of views. In addition, using views to store the pseudo table data may come with the advantage that existing database query optimizers may typically be capable of handling them, e.g., no changes to the main query engine of the DBMS may be required. All values contained in a pseudo table are available as literals in the view, hence a database query optimizer may not need special statistical information on pseudo tables as it is aware of the values of pseudo table rows.

A view or database view refers to a virtual table or pseudo table whose contents are defined by one or more query statements. For example, the query associated with the created view may, e.g., be a SQL CREATE TABLE AS statement to create the view from the table that is listed in the statement.

According to one example, the method further comprises adding a table type representing the pseudo table in a database catalogue of the DBMS. For example, each view in the DBMS may be assigned a corresponding table type. The table type indicates whether a database view of the DBMS represents a pseudo table. This example may enable to seamlessly integrate the present subject matter with existing database management systems. This data type may, for example, enable checking if the database view is pseudo table or not. This may be advantageous. For example, when data is inserted into a table, it may first be checked if the table is a pseudo table by checking the view type. For example, if the view is of type "P", the view is being replaced in order to add the values to be inserted.

According to one example, the method further comprises receiving a request to insert the one or more records in the table, and, in response to the request, determining whether the table is a pseudo table. In response to determining that the table is a pseudo table, the method performs the inserting of the one or more records in the pseudo table. This example may particularly be advantageous in cases when the table is created from scratch. This example may enable that the pseudo table is first created for an empty table and only after a certain period, e.g., few days, requests to insert records in that created pseudo table may be received. Upon receiving such a request, it may be checked whether the table referenced in the request is a pseudo table, e.g., using the type "P", and if so the insertion of the records may be done by inlining their attribute values in the program.

According to one example, the method further comprises: receiving a request to update one or more records of the table or to remove one or more records of the table. In response to the request, the materialization of the table may be performed and the request may be executed on the physically created table. The reception of this type of request may indicate that the pseudo table is not a static table and thus may need to be materialized even if the program does not reach the size limit. Indeed, when updating contents of a pseudo table or deleting rows from it, it may be fair to assume that the table is an active table which may receive multiple other changes in the future. For example, a request such as SQL UPDATE or DELETE may trigger materialization of the pseudo table prior to execution of the UPDATE or DELETE request.

According to one example, the method further comprises: receiving a request to update one or more records of the table or to remove one or more records of the table. In response to the request, the method modifies the program to satisfy the request, determines whether the table satisfies a materialization criterion, and in response to determining that the table satisfies the materialization criterion, materializes the table by physically creating the table with the records encoded in the program and removing the program. This may provide an alternative implementation of the update/delete requests that may seamlessly be integrated with the present method. For example, a SQL UPDATE or DELETE request may be implemented by modifying the view and not materializing the pseudo table.

According to one example, the materialization criterion requires at least one of: the program reached a size limit, an update request of the table is received, a deletion request of one or more records of the table is received, and a request to materialize the table is received. The size limit may, for example, be defined by the maximum number of table rows in the program.

For example, the size limit may be defined by at least one of the following factors: a) the maximum length of the statement text to create the view, in which typically the statement text limit can be multiple Gigabytes; b) the maximum number of related table objects (like indexes and triggers), as their definition may need to be stored as part of the statement text that creates the pseudo table; and c) the existence of content with large data types, like VARBINARY, in which casting this data type to a smaller representation may help to save space, e.g., VARBINARY could be casted to DOUBLE integer value.

According to one example, the method further comprises: providing a database comprising tables, and processing each existing table of the database. The processing of the existing table comprises: determining whether the existing table is a small table according to a table size criterion. In response to determining that the existing table is a small table, performing the present method for the storing of the existing table, and removing the existing table from the database. The execution of the present method for storing the existing table may comprise the creation as described herein of a pseudo table (e.g., in the form of a view) representing the existing table. This example may enable cleaning the database from empty and small tables. This may save processing resources and storage resources.

According to one example, the table size criterion requires at least one of: the table has a maximum number of records, and the table does not comprise more than a predefined number of attributes of large data type. For example, a small table may not comprise more than two attributes of type VARBINARY.

According to one example, the processing of the existing tables is performed using a configurable table virtualization checker. The checker may run regularly in the background. For example, the configurable table virtualization checker may run regularly in the background on a configurable schedule. It may check for non-pseudo tables that are either empty or only contain up to a few rows. The row limit may be configurable. Depending on the policy assigned with the virtualization checker, empty tables are converted into pseudo tables and small tables are converted into pseudo tables with data being inlined.

According to one example, the method further comprises: setting on each table of the database a virtualization protection flag to indicate whether to create a pseudo table or not, wherein the processing of the existing table is performed if the flag is set for the existing table. The virtualization protection flag may be introduced for existing physical tables. When the virtualization protection flag is set on a table, the table may not be considered by the virtualization checker. As an example, some tables may only be modified on larger intervals but still in a regular manner, like during month end closings, and users may decide that these tables should not be virtualized. By default, tables may be unprotected. This may also enable users to decide to protect given tables from being virtualized.

According to one example, the processing of the tables is repeated on a configurable schedule. The configurable schedule may be a schedule. The configurable schedule may, for example, indicate the times at which the database may be processed to convert the small tables. This may enable a controlled and systematic cleaning of the database.

According to one example, the method further comprises adding a definition of an index associated with the pseudo table, wherein the index is physically created in response to materializing the pseudo table. This example may enable a prior definition of the index that can be created and then used immediately after the pseudo table is materialized. This may enable a fast processing of the tables. The index may enable access to the physical table that results from the materialization of the pseudo table. The index may, for example, be defined by a piece of code that may or may not be part of the program or pseudo table.

For example, index definitions may not be stored as part of the CREATE VIEW statement that defines the pseudo table. In this case, indexes are created separately, but with a deferred materialization option i.e., they exist but are not materialized yet. These indexes only may be materialized when the related pseudo table is materialized. Until then, the database query optimizer may not take these indexes into account. They may also not be considered for statistics collection or reorganization evaluation tasks. The advantage of this option may be more available space in the CREATE VIEW statement text, for instance to store more data rows.

According to one example, the index is defined within the program. This may enable a single container for the pseudo table and associated index. This may enable efficient processing as it may use a single file rather than multiple files for processing a single pseudo table.

According to one example, the creation of the pseudo table and insertion of the records in the pseudo table are performed in one step. This may be advantageous in case the initial table to be stored is a small table comprising records to be inserted.

FIG. 1 is a flowchart of a method for storing a table T in accordance with an embodiment of the present invention. The table T is a table to be created in accordance with the present subject matter. The table T may be a new received table to be created in the computer system or an existing table of the computer system.

A pseudo table representing the table T may be created in step 101. The creation of the pseudo table comprises defining an empty version of the table in a program. That is, the program may be the pseudo table. The empty version of the table may refer to the columns or attributes of the table.

In step 103, one or more records may be inserted in the pseudo table by encoding the attribute values of the one or more records as inline data in the program. For example, if the table T is an empty table, the records may be inserted in the pseudo table upon receiving a request to insert the records after creation of the pseudo table. Alternatively, the records may be inserted automatically in the pseudo table. This may particularly be advantageous when the table T initially comprises one or more records. The execution of the created program enables access to the records of the pseudo table (which are the records of the table T). If the table T is an existing table of the system, the table T may be deleted after the insertion of the records in the pseudo table.

It may be determined in step 105 whether the pseudo table satisfies a materialization criterion. As indicated by the "No" path in the box associated with step 105, this condition may regularly be checked while more records are inserted in the pseudo table. That is, in response to determining that the pseudo table does not satisfy the materialization criterion, the method goes back to step 103. Alternatively, in response to determining that the pseudo table does not satisfy the materialization criterion, the method may end.

In response to determining that the pseudo table satisfies the materialization criterion, the pseudo table may be materialized in step 107 by physically creating the table with the records encoded in the program. The program may be removed in step 109.

In one example, the table T may belong to a set of tables to be created. The method of FIG. 1 may be repeated for each table in the set of tables. This may result in a set of programs or pseudo tables that represent the set of tables.

In one example, the method of FIG. 1 may automatically be performed, e.g., upon receiving a request to create the table.

In one example implementation, a new table containing two Fields "F1" and "F2" and no attribute values (i.e., empty table) may be created in step 101 as a pseudo table using the following statement: CREATE VIEW Tab1 AS SELECT*FROM (VALUES (NULL, NULL)) as Tab1 (F1, F2). That is, the program at step 101 may be the statement "CREATE VIEW Tab1 AS SELECT*FROM (VALUES (NULL, NULL)) as Tab1 (F1, F2)". Alternatively, steps 101 and 103 may be performed at once for the creation of a pseudo Table "Tab1" containing two Fields "F1" and "F2" and containing the following attribute values F1="Hello", F2="World" (i.e., non-empty table) as follows: CREATE VIEW Tab1 AS SELECT*FROM (VALUES ('Hello', 'World')) as Tab1 (F1, F2). That is, the program at step 101-103 may be the statement "CREATE VIEW Tab1 AS SELECT*FROM (VALUES ('Hello', 'World')) as Tab1 (F1, F2)". Adding a second row with attribute values 'Hello' and 'Again' to this pseudo table may require the modification of the pseudo table using an altered definition as follows: REPLACE VIEW Tab1 AS SELECT*FROM (VALUES ('Hello', 'World'), ('Hello', 'Again')) as Tab1 (F1, F2). For example, in order to insert the second row, the existing program/pseudo table may be modified by substituting the statement "CREATE VIEW Tab1 AS SELECT*FROM (VALUES (NULL, NULL)) as Tab1 (F1, F2)" by the new statement "REPLACE VIEW Tab1 AS SELECT*FROM (VALUES ('Hello', 'World'), ('Hello', 'Again')) as Tab1 (F1, F2)".

FIG. 2 is a flowchart of a method for storing tables in accordance with an embodiment of the present invention.

A pseudo table representing a table may be created in step 201. The creation of the pseudo table comprises defining an empty version of the table in a program. That is, the program may be the pseudo table. The empty version of the table comprises the columns or attributes of the table. This step may, for example, be repeated for other tables that may result in other pseudo tables. In addition, non-pseudo tables may also exist in the system.

A request to insert one or more records in the table X may be received in step 203. It may be determined in step 205 whether the table X is provided as pseudo table. In case the table X is a pseudo table, steps 207 to 213 may be performed. In step 207, the one or more records may be inserted in the pseudo table by encoding the attribute values of the one or more records as inline data in the program. It may be determined in step 209 whether the pseudo table satisfies a materialization criterion. As indicated in the box associated with step 209, this condition may regularly be checked until it is satisfied. In response to determining that the pseudo table satisfies the materialization criterion, the pseudo table may be materialized in step 211 by physically creating the pseudo table with the records encoded in the program. The program may be removed in step 213. As indicated by the "No" path in the box associated with step 209, this condition may regularly be checked while more records are inserted in the pseudo table. That is, in response to determining that the pseudo table does not satisfy the materialization criterion, the method goes back to step 207. Alternatively, in response to determining that the pseudo table does not satisfy the materialization criterion, the method may end.

In case the table X is not a pseudo table, meaning that it is physical table, the records may be inserted in step 215 in the physical table.

Figure 3:
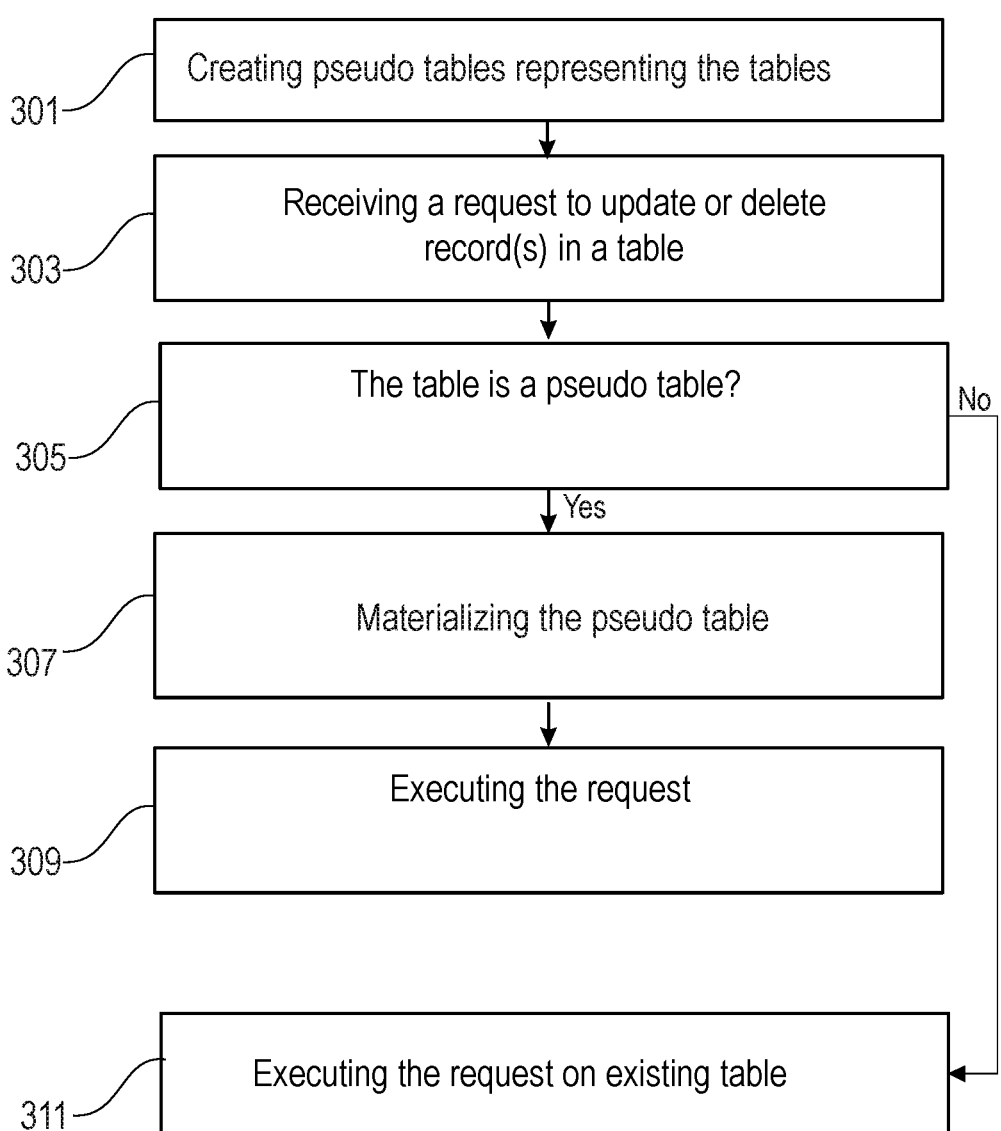
FIG. 3 is a flowchart of a method for storing a table in accordance with an embodiment of the present invention.

FIG. 3 is a flowchart of a method for updating or removing one or more records of a table in accordance with an embodiment of the present invention.

Pseudo tables representing tables, respectively, may be created in step 301. The creation of the pseudo table comprises defining an empty version of the table in a program. That is, the program may be the pseudo table. The empty version of the table comprises the columns or attributes of the table. Each pseudo table of at least part of the pseudo tables may comprise one or more records that are inserted at the time of creating the pseudo table or after creating the empty pseudo table. In addition to pseudo tables, normal tables may also be provided.

A request to update a table X or to remove one or more records of a table X may be received in step 303. It may be determined in step 305 whether the table X is provided as pseudo table. In case the table X is a pseudo table, steps 307 to 309 may be performed. The pseudo table may be materialized in step 307 and the request may be executed in step 309 on the physically created table. In case the table X is not a pseudo table, meaning that it is physical table, the request may be executed in step 311 on the existing physical table.

Figure 4:
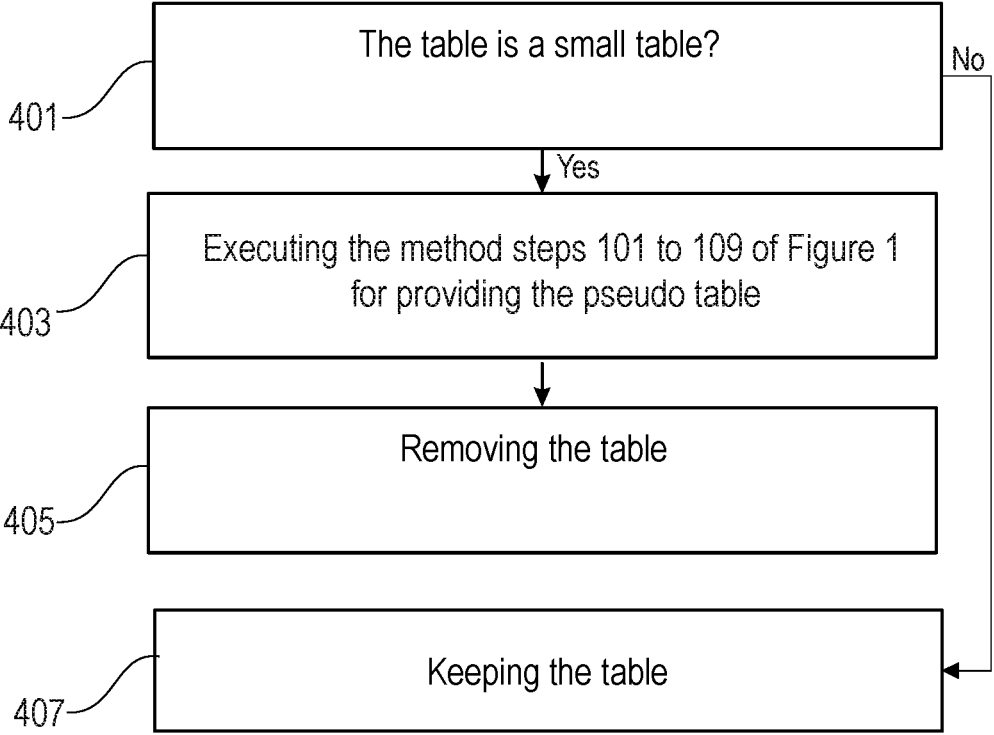
FIG. 4 is a flowchart of a method for storing a table in accordance with an embodiment of the present invention.

FIG. 4 is a flowchart of a method for managing existing tables of a database in accordance with an embodiment of the present invention.

For each existing table Y of the database steps 401 to 405 may be performed.

It may be determined in step 401 whether the existing table Y is a small table according to a table size criterion. In response to determining that the existing table Y is a small table, step 403 may be performed. Step 403 comprises the method of FIG. 1. That is, steps 101 to 109 may be executed for the table T being the existing table Y. The existing table Y may be removed in step 405 from the database. If the existing table Y is not a small table, it may be kept in step 407 as it is.

In one example, the method of FIG. 4 may regularly be repeated on a periodic basis, e.g., every day, or upon detecting a change in the database or upon receiving a corresponding request.

In one example, the method of FIG. 4 may be executed in the background by a background process. The background process may be a computer process that runs in the background and without user intervention. The background process may be a child process created by a control process for performing the method of FIG. 4. After creation, the child process may run on its own, performing the task independent of the control process, freeing the control process of performing that task.

Figure 5:
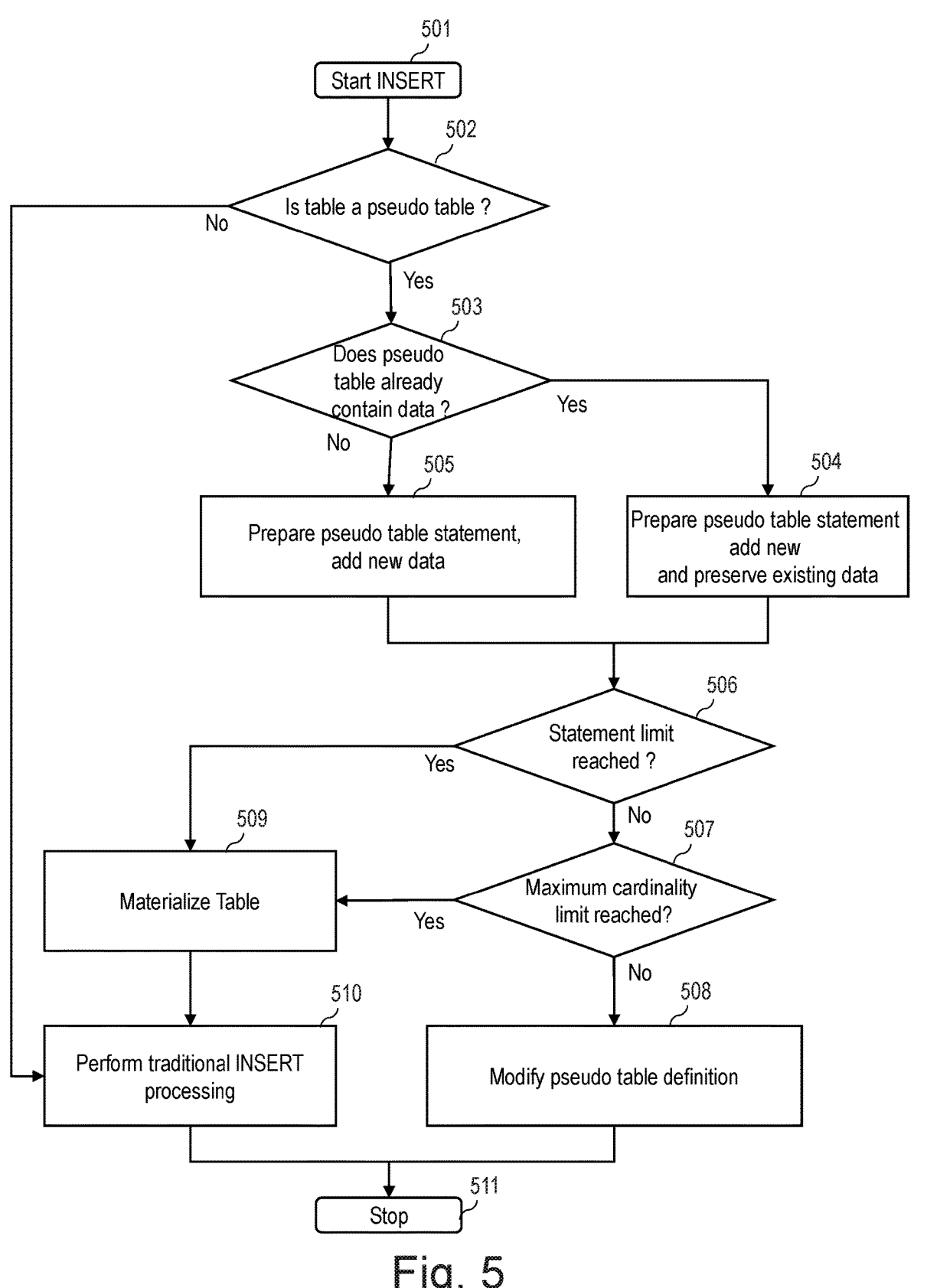
FIG. 5 is a flowchart of a method for inserting records in a table in accordance with an embodiment of the present invention.

FIG. 5 is a flowchart of a method for inserting records in a table in accordance with an embodiment of the present invention.

A request to insert records in a table may be received in step 501. The request may comprise an SQL INSERT statement. It may be determined in step 502 whether the table is a pseudo table. For example, it may be determined whether there is a program such as a view that represents the table. In case the table is not a pseudo table, the records may be inserted in the table in step 510 and the method may stop in step 511. The records may be inserted by for example executing the INSERT statement.

If the table is a pseudo table, it may be determined in step 503 whether the pseudo table contains data. If the pseudo table contains data, a statement may be prepared in step 504 to add new and preserve existing data in the pseudo table. If the pseudo table does not contain data, a statement may be prepared in step 505 to add new data in the pseudo table. For example, a code of the existing view representing the table may be redefined in steps 504 and 505 in order to add values of the new records in the view.

It may be determined in step 506 whether the statement limit is reached. If the statement limit is reached, the pseudo table may be materialized in step 509 followed by steps 510 and 511. If the statement limit is not reached, it may be determined in step 507 whether the maximum cardinality limit is reached with the records of the pseudo table. The cardinality may be the number of records. If the maximum cardinality limit is reached, steps 509 to 511 may be performed; otherwise, the pseudo table definition may be modified in step 508 followed by stopping the method in step 511. The modification may, for example, be performed by using the redefined code in the view to represent the table.

The materialization of the pseudo table Tab1 may for example be performed as follows:

CREATE TABLE Tab1_t (F1 CHAR(8), F2 CHAR(8))
    INSERT INTO Tab1_t AS SELECT FROM Tab1
    DROP VIEW Tab1

RENAME TABLE Tab1_t to Tab1

CREATE INDEX Tab1Ind1 on Tab1 (F1).

Figure 6:
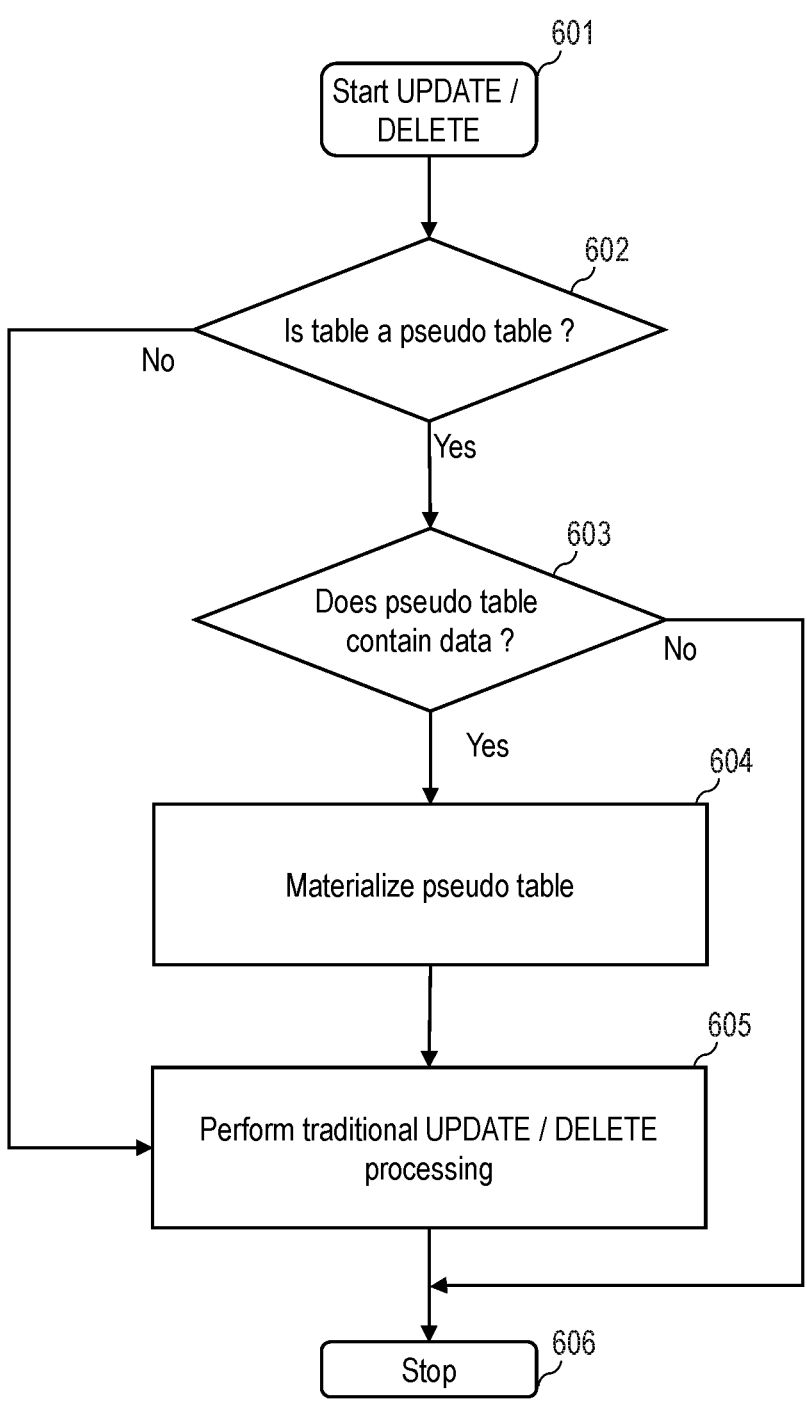
FIG. 6 is a flowchart of a method for updating ore removing a record from a table in accordance with an embodiment of the present invention.

FIG. 6 is a flowchart of a method for updating or removing one or more records of a table in accordance with an embodiment of the present invention.

A request to update or remove one or more records from the table may be received in step 601. The request may comprise an SQL UPDATE or DELETE statement. It may be determined in step 602 whether the table is a pseudo table. For example, it may be determined whether there is a program such as a view that represents the table. If the table is not a pseudo table, the update of the table or the removal of the records may be performed in step 605 and the method may stop in step 606. The step 605 may, for example, be performed by executing the UPDATE or DELETE statement.

If the table is a pseudo table, it may be determined in step 603 whether the pseudo table contains data. If the pseudo table contains data, the pseudo table may be materialized in step 604 followed by steps 605 to 606. If the pseudo table does not contain data, the method may stop in step 606.

Figure 7:
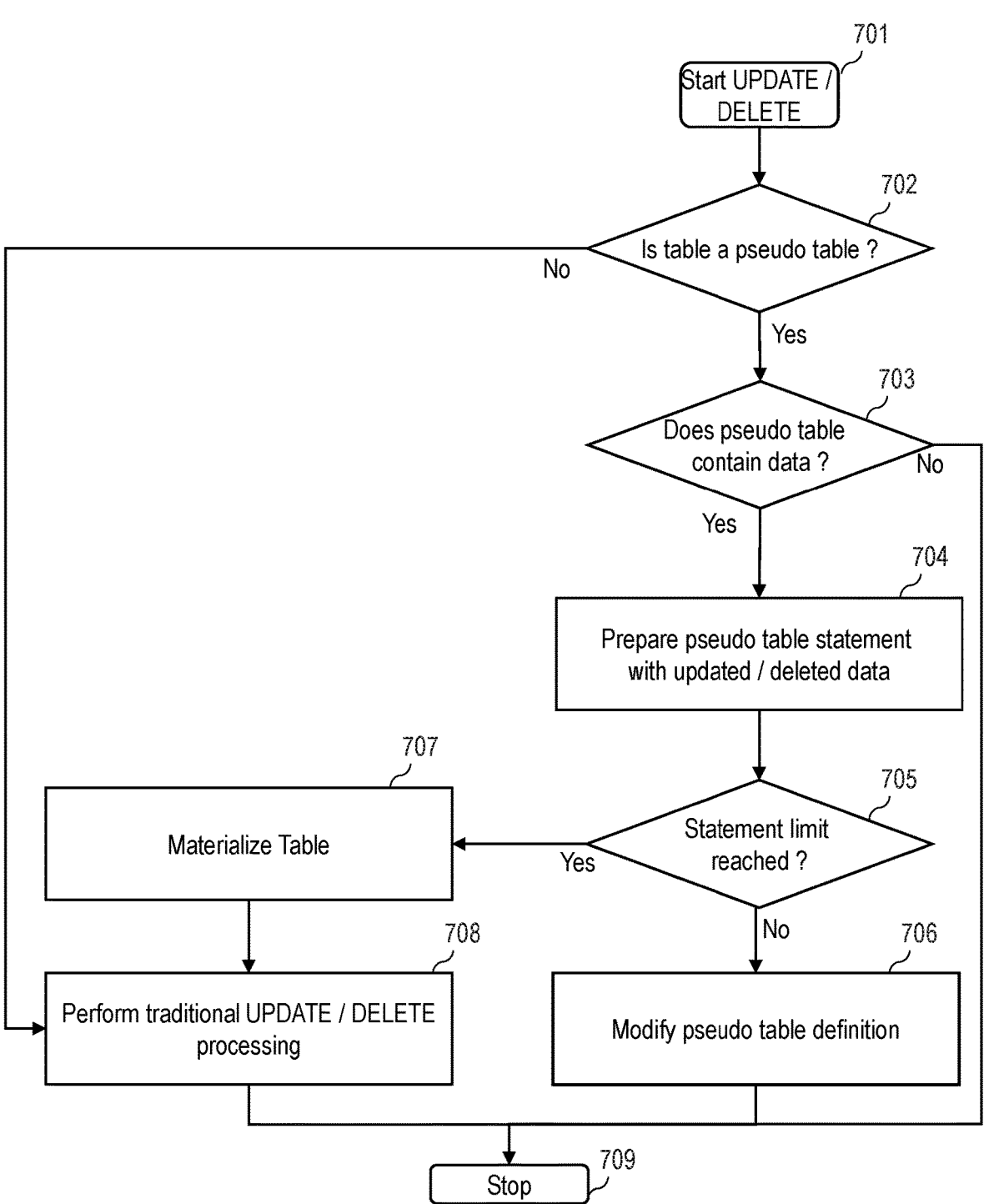
FIG. 7 is a flowchart of a method for updating ore removing a record from a table in accordance with an embodiment of the present invention.

FIG. 7 is a flowchart of a method for updating or removing one or more records of a table in accordance with an embodiment of the present invention.

A request to update or remove one or more records from the table may be received in step 701. The request may comprise an SQL UPDATE or DELETE statement. It may be determined in step 702 whether the table is a pseudo table. For example, it may be determined whether there is a program such as a view that represents the table. If the table is not a pseudo table, the update of the table or the removal of the records may be performed in step 708 and the method may stop in step 709. The step 708 may, for example, be performed by executing the UPDATE or DELETE statement.

If the table is a pseudo table, it may be determined in step 703 whether the pseudo table contains data. If the pseudo table does not contain data, the method may stop in step 709. If the pseudo table contains data, a statement may be prepared in step 704 to implement the update or removal of records in the pseudo table. For example, a code of the existing view representing the table may be redefined in step 704 in order to update or remove one or more records in the view. It may be determined in step 705 whether the statement limit is reached. If the statement limit is reached, the pseudo table may be materialized in step 707 followed by steps 708 and 709. If the statement limit is not reached, the pseudo table definition may be modified in step 706 followed by stopping the method in step 709. The modification may, for example, be performed by using the redefined code in the view to represents the table.

The following provides an example implementation of step 706. If the table is a pseudo table (P) and is not empty, the to be UPDATED data is being changed in the definition of the view. The pseudo table definition is altered, changing the to be altered data as follows: REPLACE VIEW Tab1 AS SELECT*FROM (VALUES('Good', 'Bye')) as Tab1 (F1, F2). For DELETE with a WHERE condition, the corresponding data row must be removed from the view definition. The pseudo table definition is altered, removing the to be deleted data. For single row pseudo tables, where the DELETE would remove this row, NULL values are stored as shown in the example below: REPLACE VIEW Tab1 AS SELECT*FROM (VALUES (NULL, NULL)) as Tab1 (F1, F2)". For DELETE statements without a WHERE condition, all rows of a virtual table are to be removed. In this case, NULL values are stored in the pseudo table as shown in the example below: REPLACE VIEW Tab1 AS SELECT*FROM (VALUES (NULL, NULL)) as Tab1 (F1, F2)".

Figure 8:
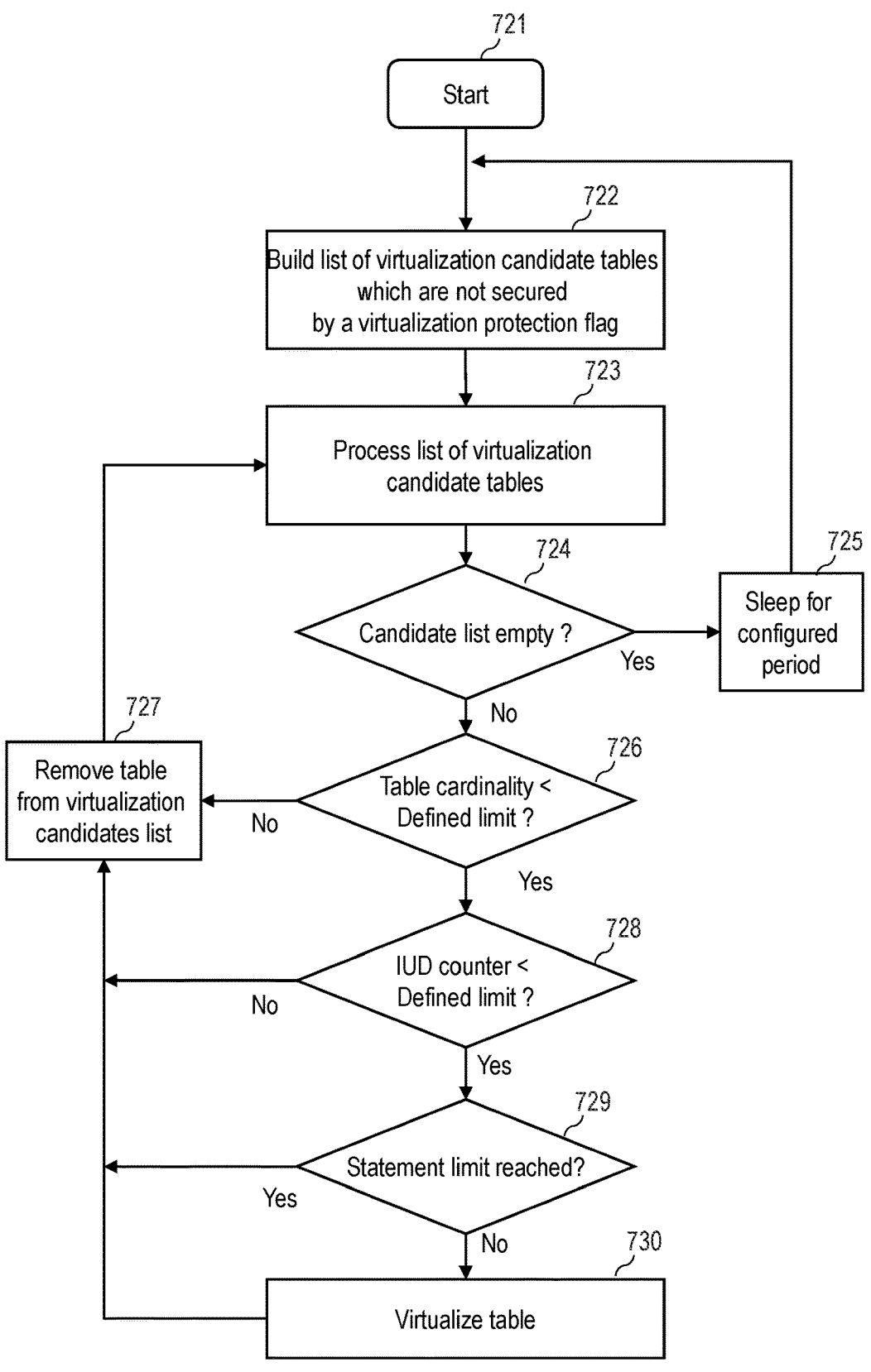
FIG. 8 is a flowchart of a method processing existing tables in accordance with an embodiment of the present invention.

FIG. 8 is a flowchart of a method for managing existing tables of a database in accordance with an embodiment of the present invention.

For example, the database may comprise tables where each table may be associated with a virtualization protection flag whose value indicates whether to virtualize or not the table.

The method may start in step 721, e.g., upon receiving a request to start. A list of virtualization candidate tables that are not secured by a virtualization protection flag may be built in step 722.

The list of virtualization candidate tables may be processed, e.g., read, in step 723 one by one. It may be determined in step 724 whether the list of virtualization candidate tables is empty. This condition may, for example, be comprised of checking whether the table lastly read in the list in step 723 was the last processed table. If the list of virtualization candidate tables is empty, the method may sleep, i.e., pause, in step 725 for a period of time. After that period of time, the method goes back to step 722. If the list of virtualization candidate tables is not empty, it may be determined in step 726 whether the current table has table cardinality that is smaller than a defined limit. If the table cardinality is not smaller than the defined limit, meaning that the current table is not a small table, the current table may be removed from the list in step 727 and the method may go back to step 723 to process a next table of the list. If the table cardinality is smaller than the defined limit, meaning that the current table is a small table, it may be determined in step 728 whether the INSERT, UPDATE, or DELETE (IUD) activity or counter is smaller than a defined limit. In case the IUD counter is not smaller than a defined limit, the current table may be removed from the list in step 727 and the method may go back to step 723 to process a next table of the list. In case the IUD counter is smaller than a defined limit, it may be determined in step 729 whether the statement limit is reached. If the statement limit is not reached, the current table may be virtualized so that a corresponding table is created in step 730, the current table may be removed from the list in step 727 and the method may go back to step 723 to process a next table of the list.

FIG. 9 is a computing environment in accordance with an embodiment of the present invention.

Computing environment 800 contains an example of an environment for the execution of at least some of the computer code involved in performing the inventive methods, such as a small tables storage code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 9. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, cither as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method comprising:
determining that a populated table, comprising a record having an attribute value, is smaller than a predefined number of records;
responsive to determining that the populated table is smaller than the predefined number of records:
creating a populated pseudo table representing the populated table, the creating the populated pseudo table comprising:
defining an empty version of the populated table in a software program;
inserting the record in the populated pseudo table by encoding the attribute value of the record of the populated table as inline data in the software program;
removing the populated table and thereby reducing overhead and resource consumption; and
responsive to receiving a request for the record:
returning the record from the populated pseudo table;
inserting additional records into the populated pseudo table;
determining that the populated pseudo table satisfies a materialization criterion based on a combination of the record and the additional records exceeding the predefined number of records; and
responsive to determining that the populated pseudo table satisfies the materialization criterion:
materializing the populated pseudo table by creating the populated table with the record and the additional records encoded in the software program;
removing the software program; and
responsive to receiving a subsequent request for the record:
returning the record from the created populated table.

2. The computer-implemented method of claim 1, further comprising providing a database management system (DBMS), wherein the software program is a database view and execution of the software program by the DBMS enables access to the record.

3. The computer-implemented method of claim 2, further comprising adding a table type representing the populated pseudo table in a database catalogue of the DBMS, the table type indicating whether a respective database view of the DBMS represents a respective populated pseudo table.

4. The computer-implemented method of claim 1, further comprising repeatedly performing, at least, the step of materializing for each further populated table, resulting in at least part of further populated tables being materialized populated pseudo tables.

5. The computer-implemented method of claim 1, further comprising:

receiving a request to insert the record in the populated table;
responsive to the request, determining that the populated table is still the populated pseudo table; and
responsive to determining that the populated table is the populated pseudo table performing the inserting into the populated pseudo table.

6. The computer-implemented method of claim 1, further comprising:
receiving a request, the request selected from the group consisting of: to update the record in the populated table and to remove the record from the populated table;
responsive to the request, performing the materialization of the populated pseudo table into the created populated table; and
executing the request on the created populated table with the record and the additional records.

7. The computer-implemented method of claim 1, further comprising:
receiving a request, the request selected from the group consisting of: to update the record in the populated pseudo table and to remove the record from the populated pseudo table; and
responsive to the request:
modifying the software program to satisfy the request.

8. The computer-implemented method of claim 1, the materialization criterion requiring that the software program reached a size limit.

9. The computer-implemented method of claim 1, further comprising:
setting, on each existing populated table of a database, a virtualization protection flag indicating whether to create a respective pseudo table, wherein processing of the existing populated table is performed responsive to the virtualization protection flag being set for the existing populated table.

10. The computer-implemented method of claim 1, further comprising adding a definition of an index associated with the populated table, wherein the index is physically created responsive to materializing the populated pseudo table.

11. The computer-implemented method of claim 10, wherein the index is defined within the software program.

12. The computer-implemented method of claim 1, wherein the creating the populated pseudo table and the inserting the record in the populated pseudo table are performed in one step.

13. The computer-implemented method of claim 1, wherein the attribute value is a float value and the inline data comprises small float format.

14. The computer-implemented method of claim 1, wherein the inline data comprises the attribute value of the record included between a beginning statement, instructions, and an ending statement of the software program.

15. The computer-implemented method of claim 1, wherein:
the populated pseudo table comprises a virtual table whose contents are defined by one or more query statements; and
the one or more query statements include the attribute value of the record.

16. A computer program product comprising:
one or more computer-readable storage media; and
program instructions stored on the one or more computer-readable storage media to perform operations comprising:

determining that a populated table, comprising a record having an attribute value, is smaller than a pre-defined number of records;

responsive to determining that the populated table is smaller than the predefined number of records:

creating a populated pseudo table representing the populated table, the creating the populated pseudo table comprising:

defining an empty version of the populated table in a software program;

inserting the record in the populated pseudo table by encoding the attribute value of the record of the populated table as inline data in the software program;

removing the populated table and thereby reducing overhead and resource consumption; and responsive to receiving a request for the record:

returning the record from the populated pseudo table;

inserting additional records into the populated pseudo table;

determining that the populated pseudo table satisfies a materialization criterion based on a combination of the record and the additional records exceeding the predefined number of records; and responsive to determining that the populated pseudo table satisfies the materialization criterion:

materializing the populated pseudo table by creating the populated table with the record and the additional records encoded in the software program;

removing the software program; and responsive to receiving a subsequent request for the record:

returning the record from the created populated table.

17. A computer system comprising:

a processor set;

one or more computer-readable storage media; and program instructions stored on the one or more computer-readable storage media to cause the processor set to perform operations comprising:

determining that a populated table, comprising a record having an attribute value, is smaller than a pre-defined number of records;

responsive to determining that the populated table is smaller than the predefined number of records:

creating a populated pseudo table representing the populated table, the creating the populated pseudo table comprising:

defining an empty version of the populated table in a software program;

inserting the record in the populated pseudo table by encoding the attribute value of the record of the populated table as inline data in the software program; and removing the populated table and thereby reducing overhead and resource consumption;

inserting additional records into the populated pseudo table;

determining that the populated pseudo table satisfies a materialization criterion based on a combination of the record and the additional records exceeding the predefined number of records; and responsive to determining that the populated pseudo table satisfies the materialization criterion:

materializing the populated pseudo table by creating the populated table with the record and the additional records encoded in the software program;

removing the software program; and responsive to receiving a subsequent request for the record:

returning the record from the created populated table.

* * * * *